United States Patent [19]

Meltsch et al.

[11] Patent Number: 5,545,851
[45] Date of Patent: Aug. 13, 1996

[54] CAP SLEEVE

[75] Inventors: Hans-Juergen Meltsch, Schwerte; Franz-Fr Froehlich, Hagen; Rainer Zimmer, Schalksmuehle; Wolf Kluwe, Hagen, all of Germany

[73] Assignee: RXS Schrumpftechnik-Garnituren GmbH, Hagen, Germany

[21] Appl. No.: 336,057

[22] Filed: Nov. 4, 1994

[30] Foreign Application Priority Data

Nov. 5, 1993 [DE] Germany .................. 43 37 864.1

[51] Int. Cl.⁶ .................................. H02G 15/10
[52] U.S. Cl. .............. 174/74 R; 174/92; 174/93; 174/77 R
[58] Field of Search ............... 174/74 R, 77 R, 174/92, 93

[56] References Cited

U.S. PATENT DOCUMENTS

| | | | |
|---|---|---|---|
| 4,237,335 | 12/1980 | Griebel et al. | 174/92 |
| 5,113,038 | 5/1992 | Dehling | 174/92 |
| 5,198,620 | 3/1993 | Behrendt et al. | 174/74 R |
| 5,399,811 | 3/1995 | Fremgen et al. | 174/93 |

FOREIGN PATENT DOCUMENTS

| | | |
|---|---|---|
| 0120541 | 10/1984 | European Pat. Off. . |
| 0236141 | 9/1987 | European Pat. Off. ........ 174/77 R |
| 2263419 | 7/1974 | Germany . |
| 2456471 | 6/1976 | Germany . |
| 4035557 | 5/1992 | Germany ................. 174/74 R |
| 455908 | 7/1968 | Switzerland . |
| 2172449 | 9/1986 | United Kingdom . |
| WO92/22114 | 12/1992 | WIPO . |

Primary Examiner—Kristine L. Kincaid
Assistant Examiner—Chau N. Nguyen
Attorney, Agent, or Firm—Hill, Steadman & Simpson

[57] ABSTRACT

A cap sleeve is composed of a cap member having an open end receiving a seal member with a sealing system. The sealing system includes the seal member acting with a second member to form a sealing chamber for receiving a sealing ring and an arrangement for moving the seal member relative to the other member to reduce the volume of a sealing channel receiving the sealing ring to cause an outward radial deformation of the sealing ring into contact with an inner surface of the cap member to form a seal therebetween.

22 Claims, 2 Drawing Sheets

CAP SLEEVE

BACKGROUND OF THE INVENTION

The present invention is directed to a cap-type sleeve composed of a cap member and a face-side seal member having cable admissions and an annular seal system between the cap member and the seal member.

U.S. Pat. No. 5,198,620, whose disclosure is incorporated herein by reference thereto and which claims priority from German Application 40 35 557, discloses a cap member that has an open end closed with a seal member. The sealing is undertaken with a seal system, wherein a necessary sealing pressure occurs with a clamping ring applied on the outside that embraces the cap member from the outside in the region of the seal. The clamping ring contains a trapezoidal channel in which the flange of the cap member and a flange on the seal member are clamped. By tightening the clamping ring, the two parts are pressed together on a seal ring. The mutual fixing of the cap member and seal member here is combined with the sealing system and, thus, requires a degree of dexterity on the part of the assembler.

Seal systems are also known wherein the fixing and simultaneous sealing occurs by screwing a seal member into a cap member. A disadvantage of such a system is that the seal is exposed to an indefinite gliding and/or wiping motion when being screwed into the cap member so that this motion may lead to a warping in the seal system under certain circumstances.

SUMMARY OF THE INVENTION

The object of the present invention is to create a cap-type sleeve wherein the assembly is facilitated and wherein no twisting or warping can occur in the seal system during the closing event.

This object is inventively achieved in an improvement in a cap-type sleeve having a cap member with an open end, a face-side seal member having a cable admission and an annular seal between the cap member and seal member. The improvement includes a holding means for the mutual fixing of the seal member in the open end of the cap member and the seal system is circumferentially arranged on the seal member and is composed of a sealing channel whose size can be diminished and contains an elastic sealing ring placed in the sealing channel, and means for moving at least one channel wall so as to reduce the channel volume to clamp the sealing ring and cause a radial deformation thereof to press the sealing ring into sealing fashion against an inside wall of the cap member to form a seal between the inside wall of the cap member and the sealing member.

A great advantage of the cap-type sleeve of the invention compared to the prior art may be seen wherein the fixing between the cap member and the seal member is produced, first, during assembly so that the individual parts are already positioned before the actual sealing. Only thereafter does the sealing event occur, wherein the seal insert in the form of a sealing ring is not subjected to any gliding or wiping motion. This promotes the sealing condition and considerably facilitates the assembly. All of the exemplary embodiments are based on these advantages, and these exemplary embodiments are to be considered as representative of other possibilities on this basis.

Other advantages and features of the invention will be readily apparent from the following description of the preferred embodiments, the drawings and claims.

DESCRIPTION OF THE PREFERRED EMBODIMENTS

Figure 1:
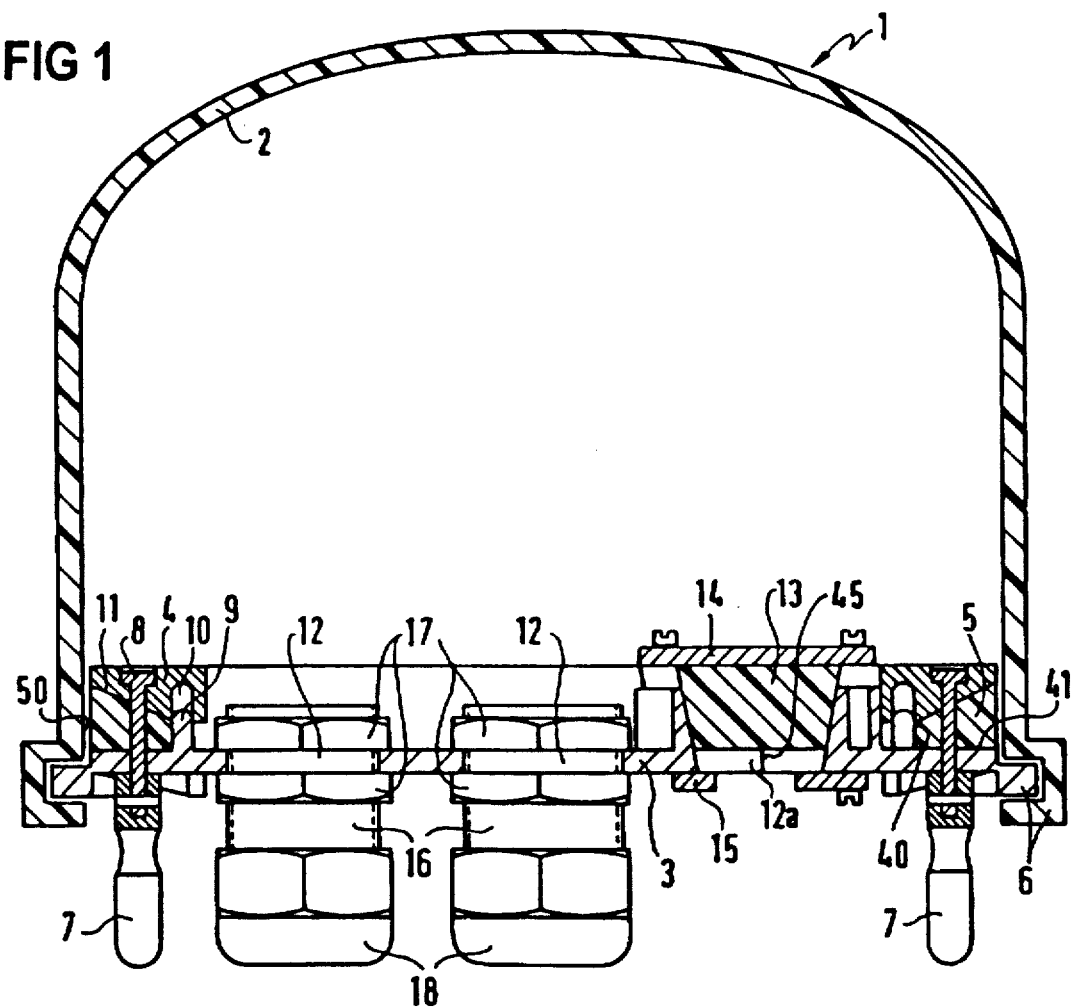
FIG. 1 is a cross sectional view of a cap member with a sealing member disposed in an opening thereof with the sealing ring being in an unsealed state.

The principles of the present invention are particularly useful when incorporated in a cap-type sleeve, generally indicated at 1 in FIG. 1. The cap-type sleeve includes a cap member 2 which is separated from the seal member 3, and these two parts are joined and coupled to one another via a wraparound fixing system or holding means 6, which is represented here as a wraparound channel of the cap member 2 having an edge of the seal member 3 introduced therein without the seal system having a sealing ring 5 being initially influenced. This type of fixing can occur, for example, via corresponding pins and bores, cut-outs and projections engaged into one another or with a bayonet-type closure. In the illustrated embodiment, such a bayonet-type closure is illustrated and appropriate locking mechanisms are provided in all of the holding means or devices in the final position in order to prevent an unintentional opening.

After the mechanical fixing has been undertaken, the seal between the cap member 2 and the sealing member 3 is undertaken. The mutual seal system is composed of a wraparound sealing ring 5 that is introduced into a wraparound channel, a sealing channel or an annular sealing channel 40. The volume of this channel 40 can be reduced with at least one movable wall so that the pressure on the introduced sealing ring 5 occurs and causes an elastic deformation of the sealing material in a radially outward direction. The details regarding the seal shall be set forth below.

This sealing annular channel 40 is formed by an edge region 41 of the seal member 3 and by a channel wall 11 on a wraparound or shaping ring 4. The ring 4 is also fashioned as the movable channel wall, and this is pulled against the seal member 5, for example, by placing rockers 7 therearound so that the width of the channel 40 and, thus, the volume of the channel 40 can be reduced. This results in the fact that, as already set forth above, the inserted sealing ring 5 is compressed and deformed, namely so that it presses against an annular wall surface 50 of the cap member 2 in a sealing fashion at the outside of the channel. The floor of the channel 40 is also modified, and this floor is formed by a guide ring 9 of the seal member 3 and by a concentrically proceeding channel 10 of the shaping ring 4 into which the guide ring 9 enters. The sidewall 11 of the shaping ring 4 expediently proceeds conically in an expanded outward direction so that the deformation of the sealing ring 5 toward the outside is promoted.

Figure 1A:
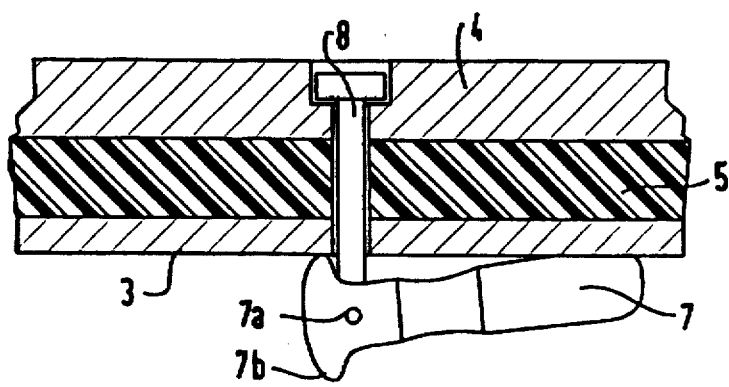
FIG. 1a is an enlarged elevational view with portions broken away illustrating one of the rockers in a closed or sealing position.
Figure 2:
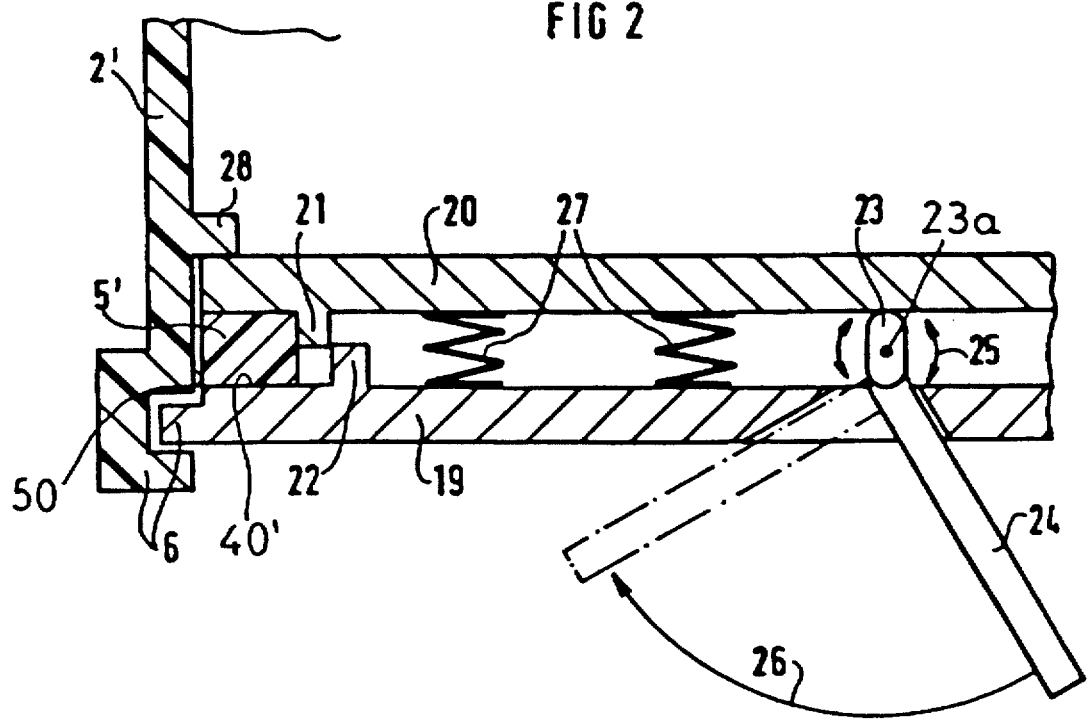
FIG. 2 is a partial cross sectional view of a sealing insert in accordance with an embodiment of the present invention utilizing spring power.

The rockers 7, which act on an outer surface of the sealing member 3, act on the shaping ring 4 with tensile elements 8, whereby the sealing of the through bore for the tensile elements of the rockers 7 are likewise sealed by the sealing ring 5. Another solution is not shown here, but is to arrange the shaping ring on the outside of the seal member so that the lead-throughs or openings for the rocker arms through the seal member 3 are not necessary. Otherwise, the same conditions are preserved. After actuation, the rocker arms 7 rotates about a pivot 7a and, due to an overcenter of a cam portion 7b (see FIG. 1a) are locked in the final position in order to prevent an unintentional spring-back and disengagement.

The seal member 3 contains various cable introduction openings 12 and 12a that are provided with cables and sealed in known ways. Representative thereof, for example, are screw-in cable introduction connectors 16 that are fixed in a sealing fashion in the cable introduction openings 12 with a threaded nut 17. The free ends of the connector 16 are closed with terminating caps 18 in a known way, dependent on the embodiment. Another type of seal can occur with the assistance of elastic sealing blocks 13 that are introduced into the preferably conically proceeding cable introduction openings 12a. The compression of the sealing block 13 and, ultimately, the sealing relative to the introduction cable then occurs with the assistance of wraparound or shaping rings 14 and 15.

The seal members 3 can be fashioned circular or oval in all embodiments. The oval embodiment is particularly suited for the introduction of uncut light waveguide lead-throughs, whereby the spacing of the cable introduction openings and the fashioning of the cap member must be matched so that the minimally allowed curvature radius of the light waveguides is not exceeded. Moreover, a division of the seal member, such as illustrated in the above-mentioned U.S. Patent, must be provided with the divisions passing through the introduction openings, such as a division line 45 in the opening 12a of FIG. 1. This enables the introduction of uncut cables. Another possibility is that the seal member comprises cable introduction openings that are accessible proceeding from the outer circumference of the seal member, and these cable introduction openings are then sealed with appropriately shaped sealing blocks. In these cases, the seal blocks must likewise be slotted so that the uncut cables can be introduced.

The application for a cap-type sleeve that is composed of a cap closed on one end and is terminated with the described seal member at its open end have, thus, been set forth up to now. However, it is also possible to employ a socket pipe that is fashioned to form a cap member by introducing a further or additional seal member of the present type mentioned above at the other end so that the pipe can also be employed as a through sleeve.

In a second embodiment of a cap-type sleeve 2' of the invention, the separation of mechanical fixing and sealing is likewise undertaken. The mechanical fixing between the cap member 2' and the seal member 19 can be implemented with holding means or devices 6 in the way already set forth. The sealing with the variable-volume channel 40' and the sealing ring 5' introduced in this sealing channel, however, occurs here with a pressure block 20 held parallel to the seal member 19 or with a ring. Tension springs 27 are arranged as clamp elements between this pressing block 20 and the seal member 19. These tension springs 27 are held spread-apart in their installed condition with the assistance of clamp elements 23–24.

The wraparound channel, sealing channel or annular channel is introduced and have an initially large volume and is formed in this way so that the seal ring 5' is introduced and lies in an undistorted, undeformed, relaxed condition. The combination of the seal member 19 and the pressing block 20 is introduced into the cap sleeve or cap member 2' until an inner stop 28 of the cap member 2' engages the block member 20. The channel floor of the sealing channel, moreover, is formed by a wraparound or annular guide edge or rib 22 of the member 19 and by a concentric, second annular guide edge or rib 21 of the pressure block 20. The two concentric guide ribs 21 and 22 are offset so that they slide past one another and, thus, form a variable channel floor.

After the mechanical introduction and fixing has been completed, the clamp elements 23–24 that effects the spreading of the tension springs 27 is pivoted around a pivot 23a in the direction of arrow 26 so that a cam portion 23 rotates to release the spreading force. As a result of this release of the spreading force, the spring power of the tension springs 27 is released to cause a constriction of the sealing channel 40' and to compress the sealing ring 5 in a sealing fashion against the inside wall surface 50 of the cap member 2'. When the cap-type sleeve is to be reopened, the clamping elements 23–24 are pivoted in the direction opposite to the arrow 26 to spread the member 19 and the block 20 apart against the tension of the springs 27. As a result of spreading the two members apart, the sealing ring is relaxed and the seal member can then be moved.

Figure 3:
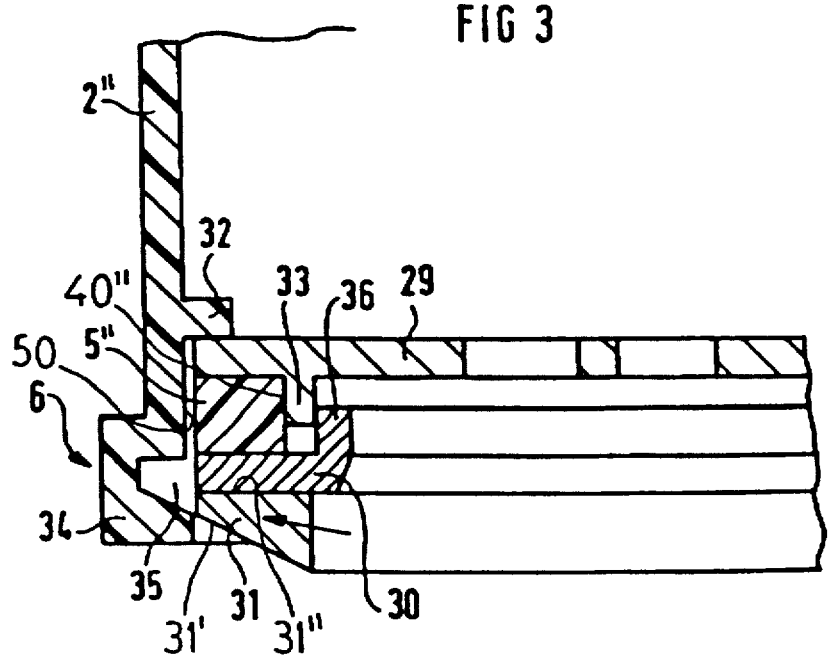
FIG. 3 is a partial cross sectional view of a second embodiment of the sealing ring with the sealing pressures produced by spreading a clamping ring.

A second exemplary embodiment is illustrated in FIG. 3 and has a variation of the channel floor of the sealing channel occurring proceeding from the outside with the assistance of a clamp element fashioned as a spreader ring 31. Here, the actual seal member 29 is inwardly introduced up to a stop 32 of the cap member 2" and an outwardly directed guide ring 33 together with a guide ring 36 of a shaping ring 30 forms the channel floor of the variable sealing channel 40" in which a wraparound sealing ring 5" is again inserted. The pressing of the sealing ring 5" is undertaken, here, with a spreader ring 31 that is arranged to lie on the shaping ring 30 outside the seal member arrangement. The spreader ring 31 has a wedge-shaped cross section with a surface 31' being conical and tapering upward to a surface 31" that acts on the shaping ring 30. Thus, the spreader ring 31 will enter into a corresponding annular channel 35 of the cap member 2" when the spreader ring 31 is spread. The channel 35 has a contact wall 35' which has a likewise fashion to be similar to the surface 31'. The spreading of the spreader ring 31 will cause movement in the direction of the arrow, and, due to the oblique or conical surfaces, a force exerted onto the shaping ring 30 in an axial direction that will lead to the constriction of the sealing channel 40" and to the pressing of the sealing ring 5". Here, too, the sealing ring 5" is, thus, pressed in a sealing fashion against the inside wall surface 50 of the cap member 2". The holding device or means for the mutual mechanical fixing of the individual parts can be retained as in the preceding embodiments.

The sealing rings 5, 5' and 5" employed in all the exemplary embodiments can be composed of resilient material, preferably of a silicone rubber or of a rubber, such as EPDM, which is ethylene-propylene-diene-rubber (terpolymer).

Although various minor modifications may be suggested by those versed in the art, it should be understood that we wish to embody within the scope of the patent granted hereon all such modifications as reasonably and properly come within the scope of our contribution to the art.

We claim:

1. In a cap sleeve composed of a cap member with an open end, a face-end seal member having cable admissions and an annular seal system between the cap member and seal member, the improvements comprising holding means being provided for the mutual fixing of the seal member in the open end of the cap member, the seal system being circumferentially arranged in the seal member and being composed of a sealing channel having a volume which can be diminished, an elastic sealing ring disposed in said sealing channel and means for shifting at least one channel wall for reducing the channel volume so that the sealing ring is pressed in a sealing fashion against an inside wall surface of the cap member due to deformation of the sealing ring.

2. In a cap sleeve according to claim 1, wherein the holding means is formed of radially corresponding elements that engage into one another, including pin-like projections and bores.

3. In a cap sleeve according to claim 1, wherein the holding means is formed by projections and coacting cut-outs of the cap member and seal member that mutually interact.

4. In a cap sleeve according to claim 1, wherein the holding means is constructed as a bayonet closure.

5. In a cap sleeve according to claim 1, wherein the holding means includes a lock for locking the cap member and the seal member in the ultimately held position.

6. In a cap sleeve according to claim 1, wherein said at least one channel wall is formed by a shaping ring movable in an axial direction of the cap sleeve, said shaping ring comprising clamping elements, said sealing channel being formed between the shaping ring and the seal member, said shaping ring having a conical-shaped sidewall so that the sealing channel has an increasing width in the radial direction, a channel floor for the sealing channel being formed by corresponding edges of the seal member entering into a channel of the shaping ring.

7. In a cap sleeve according to claim 6, wherein the shaping ring can be pressed onto the sealing member with clamping rockers.

8. In a cap sleeve according to claim 1, wherein a pressing block is arranged at a distance parallel to a disc-shaped seal member to form sidewalls of the sealing channel, said sealing channel having a floor formed by concentric circumferential guide edges of the pressing block and the seal member, tension springs being disposed between the pressing block and the seal member and at least one clamp element for applying a spreading force to counteract the tension spring being arranged between the pressing block and seal member.

9. In a cap sleeve according to claim 1, which includes a shaping ring movable in the axial direction of the cap sleeve being provided with an annular guide ring, said guide ring coacting with a concentric guide ring of the seal member to form a channel floor for the sealing channel, a spreader ring fashioned as a clamp element and having a conical sidewall engaging a conically-matched annular channel of the cap member so that with a spreading of the spreader ring, the shaping ring is pressed against the seal member to radially deform the sealing ring into engagement with the inner wall surface of the cap member.

10. In a cap sleeve according to claim 1, wherein the sealing ring is composed of a resilient material selected from a group consisting of silicone and EPDM.

11. In a cap sleeve according to claim 1, wherein the means for shifting includes clamp elements arranged on the inwardly-directed side of the seal member.

12. In a cap sleeve according to claim 1, wherein the means for shifting includes clamp elements arranged on an outwardly-directed side of the seal member.

13. In a cap sleeve according to claim 1, wherein the seal member is a circular configuration.

14. In a cap sleeve according to claim 1, wherein the seal member has an oval configuration.

15. In a cap sleeve according to claim 1, wherein the seal member has at least one cable introduction opening, a sealing block of elastic material being arranged in the cable introduction opening and a pressing member acting on the sealing block for compressing the block into said introduction opening.

16. In a cap sleeve according to claim 15, wherein the cable introduction opening has a conical shape.

17. In a cap sleeve according to claim 15, wherein the sealing block is slotted.

18. In a cap sleeve according to claim 1, wherein the sealing member has a cable introduction opening receiving an introduction connector.

19. In a cap sleeve according to claim 18, wherein the introduction connector is provided with a terminating cap.

20. In a cap sleeve according to claim 1, wherein the seal member is divided so that a parting line passes through an introduction opening.

21. In a cap sleeve according to claim 1, wherein the seal member comprises cable introduction openings proceeding from the edge.

22. In a cap sleeve according to claim 1, wherein the cap member is formed of a cylindrical socket pipe and has a seal member and sealing system disposed at each end.

* * * * *